(12) United States Patent
Pistol (10) Patent No.: US 9,690,688 B2
(45) Date of Patent: Jun. 27, 2017

(54) METHOD AND APPARATUS FOR GENERATING ELEMENTARY STRING SETS FOR UNIT TESTING REGULAR EXPRESSIONS

(71) Applicant: HERE Global B.V.

(72) Inventor: Bogdan Ciprian Pistol, Berlin (DE)

(73) Assignee: HERE Global B.V., Eindhoven (NL)

( * ) Notice: Subject to any disclaimer, the term of this patent is extended or adjusted under 35 U.S.C. 154(b) by 317 days.

(21) Appl. No.: 13/779,898

(22) Filed: Feb. 28, 2013

(65) Prior Publication Data

US 2014/0245265 A1  Aug. 28, 2014

(51) Int. Cl.
*G06F 9/44* (2006.01)
*G06F 11/36* (2006.01)

(52) U.S. Cl.
CPC ...... *G06F 11/3684* (2013.01); *G06F 11/3676* (2013.01)

(58) Field of Classification Search
None
See application file for complete search history.

(56) References Cited

U.S. PATENT DOCUMENTS

2007/0282833 A1* 12/2007 McMillen ............. H04L 63/145
2010/0228783 A1*  9/2010 Castellanos ......... G06F 11/3672
                                                            707/797

OTHER PUBLICATIONS

Xeger, A Java Library for generating random text from regular expressions, Oct. 17, 2009, http://code.google.com/p/xeger/source/browse/, accessed on Apr. 15, 2015.*
Regldg, "A regular expression grammar language dictionary generator", http://regldg.com/index.php, Internet Archive Aug. 25, 2011, accessed on Dec. 14, 2015.*
Microsoft, "The Regular Expression Generator" for Visual Studio 2005, https://msdn.microsoft.com/en-us/library/aa833197(v=vs.80).aspx, accessed on May 2, 2016.*
Bille et al. Regular Expression Matching with Multi-strings and Intervals, Proceedings of the twenty-first annual ACM-SIAM sumponsium on Discrete Algorithms (SODA '10), Philadelphia, PA, 2010, pp. 1297-1308.*
Wikipedia, "Regular Expression", http://en.wikipedia.org/wiki/Regular_expression, Internet Archive Jan. 7, 2012.*

* cited by examiner

*Primary Examiner* — H S Sough
*Assistant Examiner* — Timothy Duncan
(74) *Attorney, Agent, or Firm* — Alston & Bird LLP (57) ABSTRACT

A method, apparatus, and computer program product are disclosed to generate elementary string sets for unit testing regular expressions. In the context of a method, a regular expression is received. The method also creates a deterministic finite automaton based on the regular expression. In addition, the method generates an elementary string set using the deterministic finite automaton. The elementary string is generated to test software that uses the regular expression.

9 Claims, 5 Drawing Sheets

METHOD AND APPARATUS FOR GENERATING ELEMENTARY STRING SETS FOR UNIT TESTING REGULAR EXPRESSIONS

TECHNOLOGICAL FIELD

Example embodiments of the present invention relate generally to computer software and, more particularly, to a method and apparatus for generating elementary string sets for unit testing regular expressions.

BACKGROUND

Software testing is the process and methodology for improving the quality of software products by trying to minimize the number of defects and their impact in software products. A regular expression is a pattern specification of a regular language, which can be generated by a Type-3 grammar in the Chomsky hierarchy. In software engineering, regular expressions are used for a variety of purposes, such as pattern matching of input strings.

Testing computer programs that use regular expressions may be challenging because it is not always feasible to test every possible use case for the input of the program. In some cases, the number of possibilities is unfeasibly large or even unbounded. Moreover, using regular expressions in computer programs is error prone, as the syntax and complexity of the regular expressions can be challenging to both to the software engineer that creates the regular expression in the first place and the software engineer that maintains the software program and needs to adjust a regular expression. In this regard, it may be difficult to have comprehensive test coverage in situations where software can execute different code depending on matching one or more regular expressions.

BRIEF SUMMARY

Accordingly, a method, apparatus, and computer program product are provided that facilitate the testing of computer programs that utilize regular expressions. In an example embodiment, a method, apparatus and computer program product are provided to produce elementary string sets to facilitate unit testing of regular expressions.

In a first example embodiment, a method is provided that includes receiving a regular expression, creating of a Deterministic Finite Automaton based on the regular expression, and generating, by a processor, an elementary string set using the Deterministic Finite Automaton, wherein the elementary string is generated to test software that uses the regular expression.

In another example embodiment, an apparatus is provided having at least one processor and at least one memory including computer program code, the at least one memory and the computer program code configured to, with the at least one processor, cause the apparatus to receive a regular expression, create a Deterministic Finite Automaton based on the regular expression, and generate an elementary string set using the Deterministic Finite Automaton, wherein the elementary string is generated to test software that uses the regular expression.

In another example embodiment, a computer program product is provided that includes at least one non-transitory computer-readable storage medium having computer-executable program code portions stored therein with the computer-executable program code portions comprising program code instructions that, when executed, cause an apparatus to receive a regular expression, create a Deterministic Finite Automaton based on the regular expression, and generate an elementary string set using the Deterministic Finite Automaton, wherein the elementary string is generated to test software that uses the regular expression.

In another example embodiment, an apparatus is provided that includes means for receiving a regular expression, means for creating a Deterministic Finite Automaton based on the regular expression, and means for generating an elementary string set using the Deterministic Finite Automaton, wherein the elementary string is generated to test software that uses the regular expression.

In some embodiments of the method, apparatus, and computer program product, generating the elementary string set may include adding a start state of the Deterministic Finite Automaton to a state queue, adding an empty string to a string queue, and processing states in the state queue until the state queue is empty. In some cases, processing a state in the state queue may include extracting a state from the state queue, extracting a string from the string queue, incrementing a counter associated with the extracted state, and updating a data structure to store the counter. Some such cases may further include, in an instance in which the extracted state is terminal, adding the extracted string to the elementary string set, retrieving a set of symbols that cause a transition from the extracted state to another state in the Deterministic Finite Automaton, and for each symbol of the set of symbols, updating the state queue and the string queue based on the symbol. In some embodiments, updating the state queue and the string queue based on the symbol includes determining a state to which the symbol transitions the Deterministic Finite Automaton, and, in an instance in which a counter in the data structure and associated with the state is less than a predefined value, such as 2, adding the state to the state queue; and adding a string to the string queue, the string comprising the extracted string and the symbol.

In one embodiment, each string in the elementary string set is a member of the set of strings represented by the regular expression. In another embodiment, no string in the elementary string set will include a symbol that repeats more than twice. In yet another embodiment, the elementary string set includes every string that is a member of the set of strings represented by the regular expression and that does not include a symbol that repeats more than twice.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus, and computer program product are provided in accordance with an example embodiment of the present invention in order to generate elementary string sets for unit testing regular expressions. As such, the method, apparatus, and computer program product may be embodied by any of a variety of devices. For example, the devices may include any of a variety of mobile terminals, such as a portable digital assistant (PDA), mobile telephone, smartphone, mobile television, gaming device, laptop computer, camera, tablet computer, video recorder, web camera, or any combination of the aforementioned devices. Additionally or alternatively, the computing device may include fixed computing devices, such as a personal computer or a computer workstation. Still further, the method, apparatus, and computer program product of an example embodiment may be embodied by a networked device, such as a server or other network entity, configured to communicate with one or more devices, such as one or more client devices.

Figure 1:
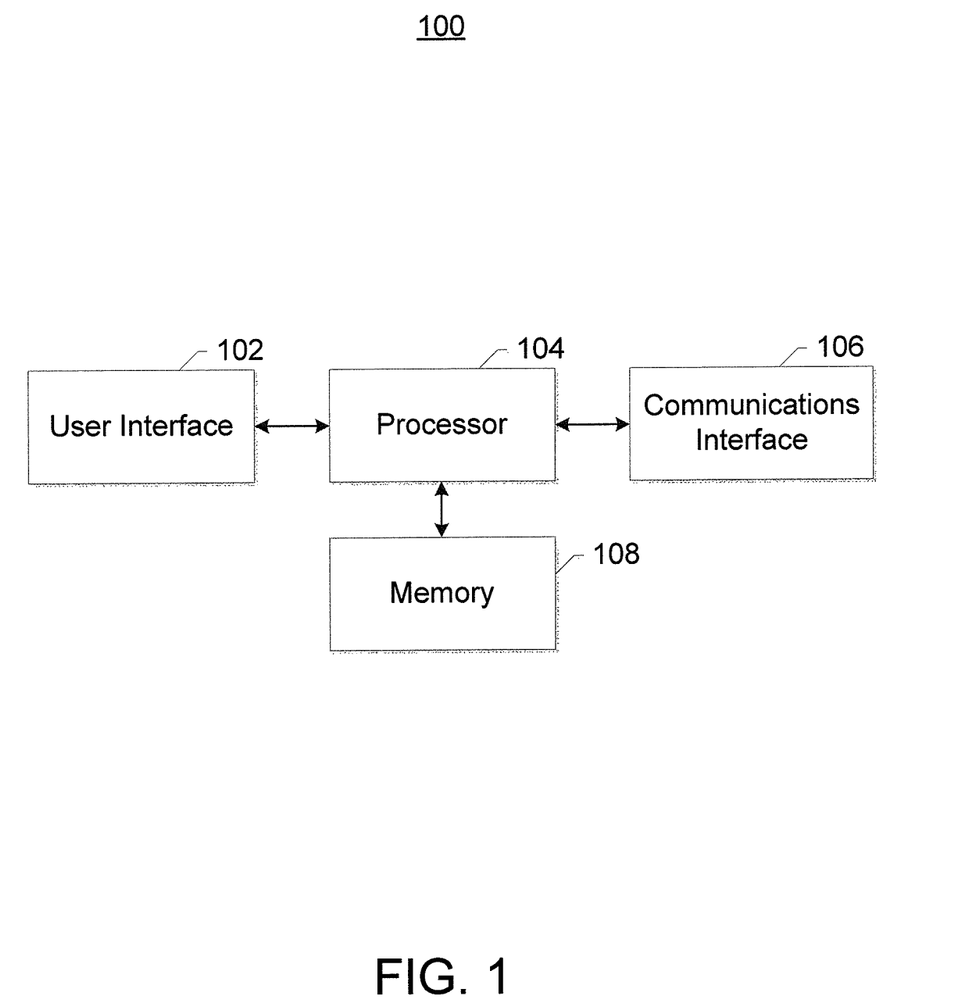
FIG. 1 shows a block diagram of an apparatus that may be specifically configured in accordance with an example embodiment of the present invention.

Regardless of the type of device, an apparatus 100 that may be specifically configured to generate elementary string sets for unit testing regular expressions in accordance with an example embodiment of the present invention is illustrated in FIG. 1. It should be noted that while FIG. 1 illustrates one example configuration, numerous other configurations may also be used to implement embodiments of the present invention. As such, in some embodiments, although elements are shown as being in communication with each other, hereinafter such elements should be considered to be capable of being embodied within the same device or within separate devices.

Referring now to FIG. 1, the apparatus 100 may include or otherwise be in communication with a processor 104, a memory device 108, and optionally a communication interface 106, and/or a user interface 102. In some embodiments, the processor (and/or co-processor or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 100 may be embodied by a computing device, such as a computer terminal. However, in some embodiments, the apparatus may be embodied as a chip or chip set. In other words, the apparatus may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 104 may be embodied in a number of different ways. For example, the processor may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA ((field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading.

In an example embodiment, the processor 104 may be configured to execute instructions stored in the memory device 108 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA, or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU), and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In some embodiments, the apparatus 100 may include a user interface 102 that may, in turn, be in communication with processor 104 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone, and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

Figure 2:
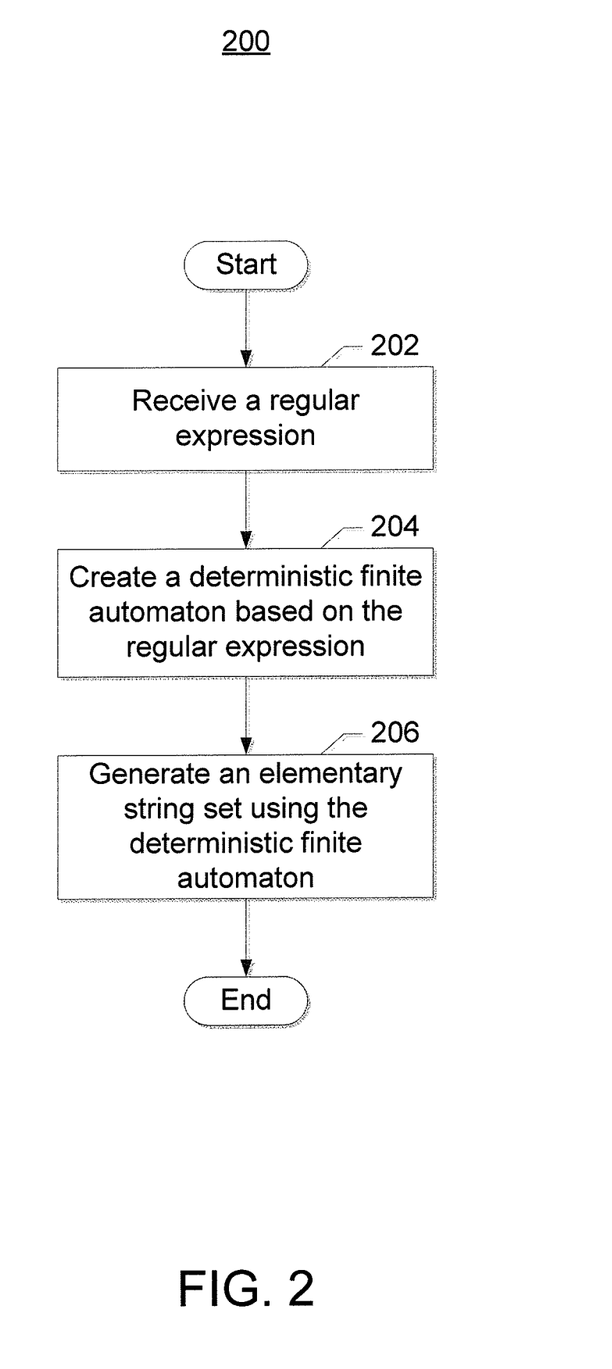
FIG. 2 illustrates a flowchart describing example operations for generating an elementary string set based on a regular expression, in accordance with some example embodiments.

FIG. 2 illustrates a flowchart containing a series of operations performed to generate an elementary string set for unit testing a regular expression. The operations illustrated in FIG. 2 may, for example, be performed by, with the assistance of, and/or under the control of one or more of processor 104, memory 108, user interface 102, or communications interface 106. In operation 202, apparatus 100 includes means, such as user interface 102, processor 104, the communications interface 106, or the like, for receiving a regular expression. As previously noted, a regular expression describes a set of strings. The set of all possible strings that a regular expression matches/accepts may otherwise be known as a regular language. The same regular language can be generated by a Type-3 grammar in the Chomsky hierarchy and also the regular language can be accepted by a (Non)Deterministic Finite Automaton (see Noam Chomsky, "Three models for the description of language", IRE Transactions on Information Theory (2), 1956).

In operation 204, the apparatus 100 further includes means, such as processor 104 or the like, for creating a deterministic finite automaton based on the regular expression. In this regard, a regular expression can be transformed into a Nondeterministic Finite Automaton (NFA) using Thomson's Algorithm, with worst case time and space complexity $O(n)$, where n is the length of the regular expression (see Ken Thompson, "Regular expression search algorithm", Communications of the ACM 11 (6), June 1968). Furthermore, an NFA can be transformed into a Deterministic Finite Automaton (DFA) using the Powerset Construction Algorithm (see Michael O. Rabin and Dana Scott, "Finite automata and their decision problems", IBM Journal of Research and Development 3 (2), 1959). For instance, the apparatus 100 may execute, using processor 104 or the like, computer instructions (stored, for example, in memory 108 or the like) that cause the apparatus to generate a NFA based on the regular expression received in operation 202, and to subsequently generate a DFA based on the NFA. For instance, a DFA object may be created using a createDfa(regex) function, which creates a DFA from the provided "regex" argument. The generated DFA comprises an object having a start state and a transition function between states. Subsequently, additional states may be added using an addNextState(state, label, nextState) function, which updates the transition function of the DFA associated with the "state" argument by inserting an edge labelled with the "label" argument to the "nextState" state, thus making it reachable.

Thereafter, in operation 206, the apparatus 100 may include means, such as processor 104 or the like, for generating an elementary string set for unit testing the regular expression. The elementary string set may comprise a linked list data structure that may be returned as the output of the procedure. In some embodiments, the elementary string set of a regular expression can be defined as the set of strings with the following properties:

a) Every string in the set matches the regular expression (e.g., each string in the elementary string set is a member of the set of strings represented by the regular expression);
b) Every string in the set will loop (because of the Kleene star operator) at most twice while matching the regular expression (e.g., no string in the elementary string set will include a symbol that repeats more than twice); and
c) The set of strings is maximal; there is no other string with the previous properties that matches the regular expression (e.g., the elementary string set includes every string that is a member of the set of strings represented by the regular expression and that does not include a symbol that repeats more than twice).

The comprehensive use cases for testing regular expressions are constructed from the elementary string set of the regular expression. This will provide a generic way to reliably test software programs that use regular expression to match strings and execute code depending on the matched result. Example elementary string set: the regular expression a*|b* has the elementary string set {" ", "a", "b", "aa", "bb"}. Example embodiments for generating the elementary string set are discussed below in conjunction with FIGS. 3-5.

Figure 3:
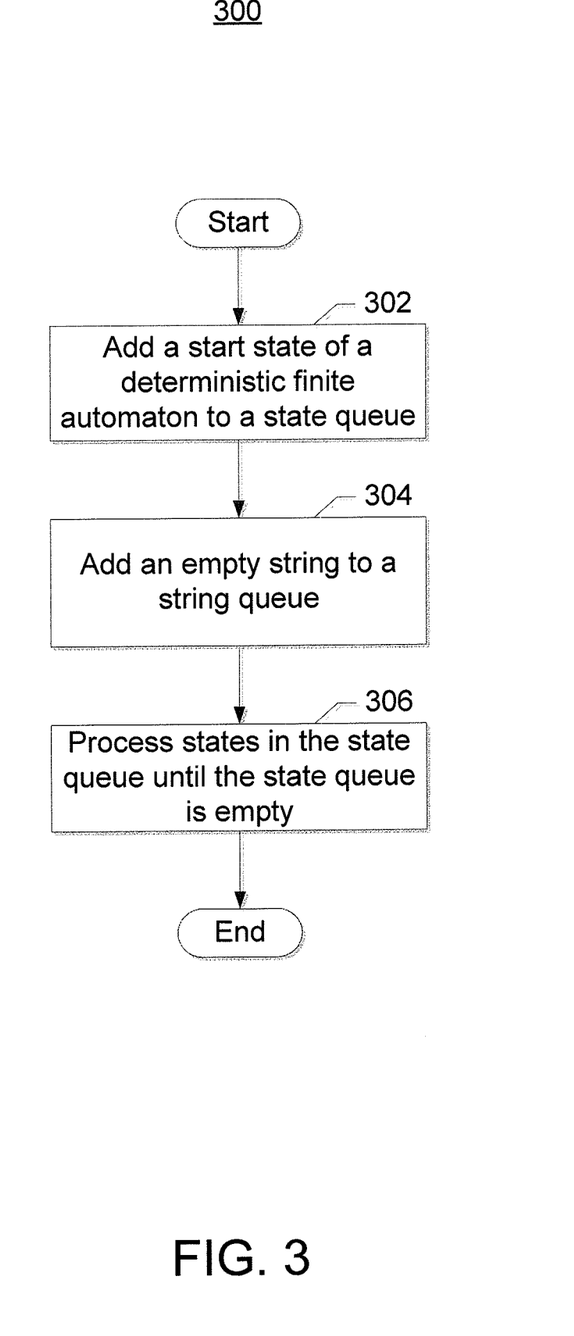
FIG. 3 illustrates a flowchart describing example operations for generating an elementary string set from a deterministic finite automaton, in accordance with some example embodiments.

Turning now to FIG. 3, a flowchart is shown that describes example embodiments for generating an elementary string set using a DFA. In operation 302, the apparatus 100 may further include means, such as the processor 104 or the like, for adding a start state of the DFA to a state queue, which may be stored, for example, in memory 108 or the like. In one embodiment, the state queue is created for processing the DFA, and therefore is empty before addition of the start state of the DFA. In operation 304, the apparatus 100 may further include means, such as the processor 104 or the like, for adding an empty string (e.g., " ") to a string queue, which may be stored, like the state queue, in memory 108 or the like. As above, the string queue may be empty prior to addition of the empty string.

In operation 306, the apparatus 100 may further include means, such as the processor 104 or the like, for processing states in the state queue until the state queue is empty. To process states, the apparatus 100 may iteratively extract the state at the head of the state queue for processing. In this regard, although operations 302 and 304 only add a single state to the state queue, processing a state in the state queue need not occur only a single time. For instance, processing a first state may add additional states to the state queue; thus, once the first state has been processed, the operation would then continue to process the additional states.

Figure 4:
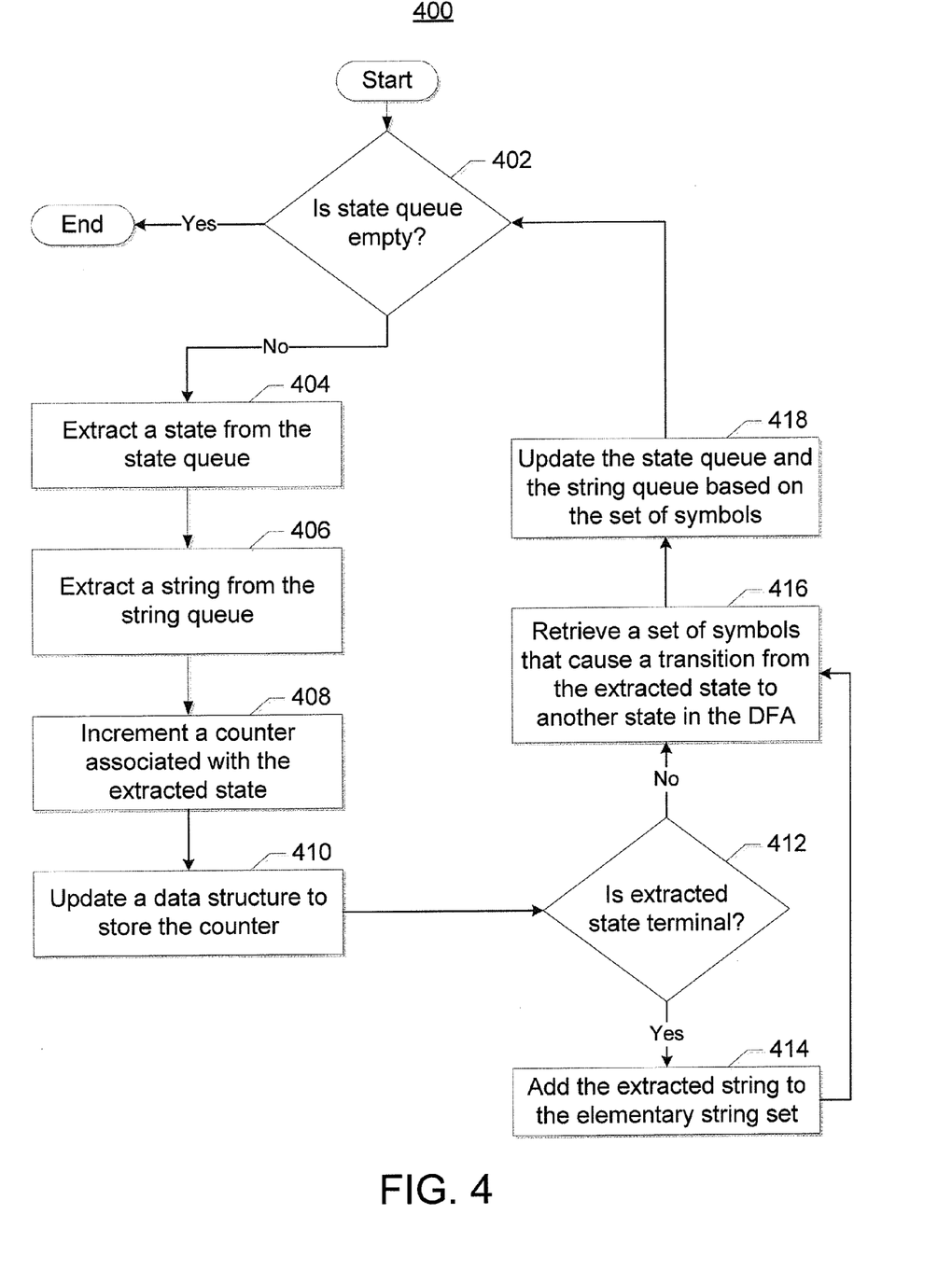
FIG. 4 illustrates a flowchart describing example operations for processing states in a state queue until the state queue is empty, in accordance with some example embodiments.

Turning now to FIG. 4, a flowchart is shown that describes example operations for processing states in the state queue until the state queue is empty. In operation 402, the apparatus 100 may include means, such as the processor 104 or the like, for determining whether the state queue is empty. If so, the procedure ends. Otherwise, in operation 404, the apparatus 100 may include means, such as the processor 104, memory 108, or the like, for extracting a state from the state queue. In one embodiment, the state queue comprises a First-In-First-Out (FIFO) queue data structure, in which each state extracted is the state that has been in the queue the longest. Similarly, in operation 406, the apparatus 100 may include means, such as the processor 104, memory 108, or the like, for extracting a string from the string queue. In one embodiment, the string queue also comprises a FIFO queue data structure.

Regardless of the specific data structure used, however, in some embodiments a parallel between the state queue and the string queue is maintained, in that they will contain the same number of elements. Accordingly, in these embodiments each state in the string queue comprises a string that matches the corresponding state in the state queue. In other words, the string and the corresponding state represent the regular expression up until the DFA state.

Note that although operation 406 occurs after operation 404 and prior to operation 408 in the example embodiment shown in FIG. 4, in other embodiments operation 406 may occur prior to operation 404, or alternatively may occur after operations 408, 410, and/or 412, which are discussed below. Moreover, in embodiments in which an extracted state is not terminal (as discussed below with respect to operation 412), operation 406 may alternatively occur after operations 416 and/or 418.

In operation 408, the apparatus 100 may further include means, such as the processor 104 or the like, for incrementing a counter associated with the extracted state. In this regard, the counter for each state is initialized to hold a value of "0" and may be stored in memory 108 or the like in association with the state queue. Accordingly, in operation 410, the apparatus 100 may further include means, such as the processor 104 or the like, for updating a data structure to store the counter. In some embodiments, the data structure may comprise a tree structure and may store the states as the keys of the tree, and the counters associated with each state as the values of the tree. In one such embodiment, the tree may be a red-black tree data structure. However, alternative tree data structures may be used. Similarly, some embodiments may use other data structures, such as, for example, a skip list or the like, in place of a tree data structure.

In operation 412, the apparatus 100 may further include means, such as the processor 104 or the like, for determining whether the extracted state is terminal. During generation of the DFA according to the procedures discussed above, a terminal state is a state at which no further state transitions are necessary. Accordingly, the string corresponding to a terminal state comprises a valid output of the regular expression represented by the DFA. Thus, in operation 414, in an instance in which the extracted state is terminal, the apparatus 100 may include means, such as the processor 104, memory 108, or the like, for adding the extracted string to the elementary string set.

Regardless of whether the extracted stated is terminal, however, in operation 416, the apparatus 100 may further include means, such as the processor 104, user interface 102, communication interface 106, or the like, for retrieving a set of symbols that cause a transition from the extracted state to another state in the DFA. In this regard, the apparatus 100 may query the object storing the DFA using the extracted state to determine the set of symbols usable to reach other states. For instance, the object may include a getNextSymbols(state) function that determines and returns all the next possible symbols usable to reach some state from the given "state" argument. Thereafter, in operation 418, the apparatus 100 may include means, such as the processor 104, memory 108, or the like, for updating the state queue and the string queue for each symbol of the set of symbols, as will be discussed in more detail below in conjunction with FIG. 5. The procedure thereafter returns to operation 402 to determine whether the state queue is empty, or whether additional states shall be processed.

Figure 5:
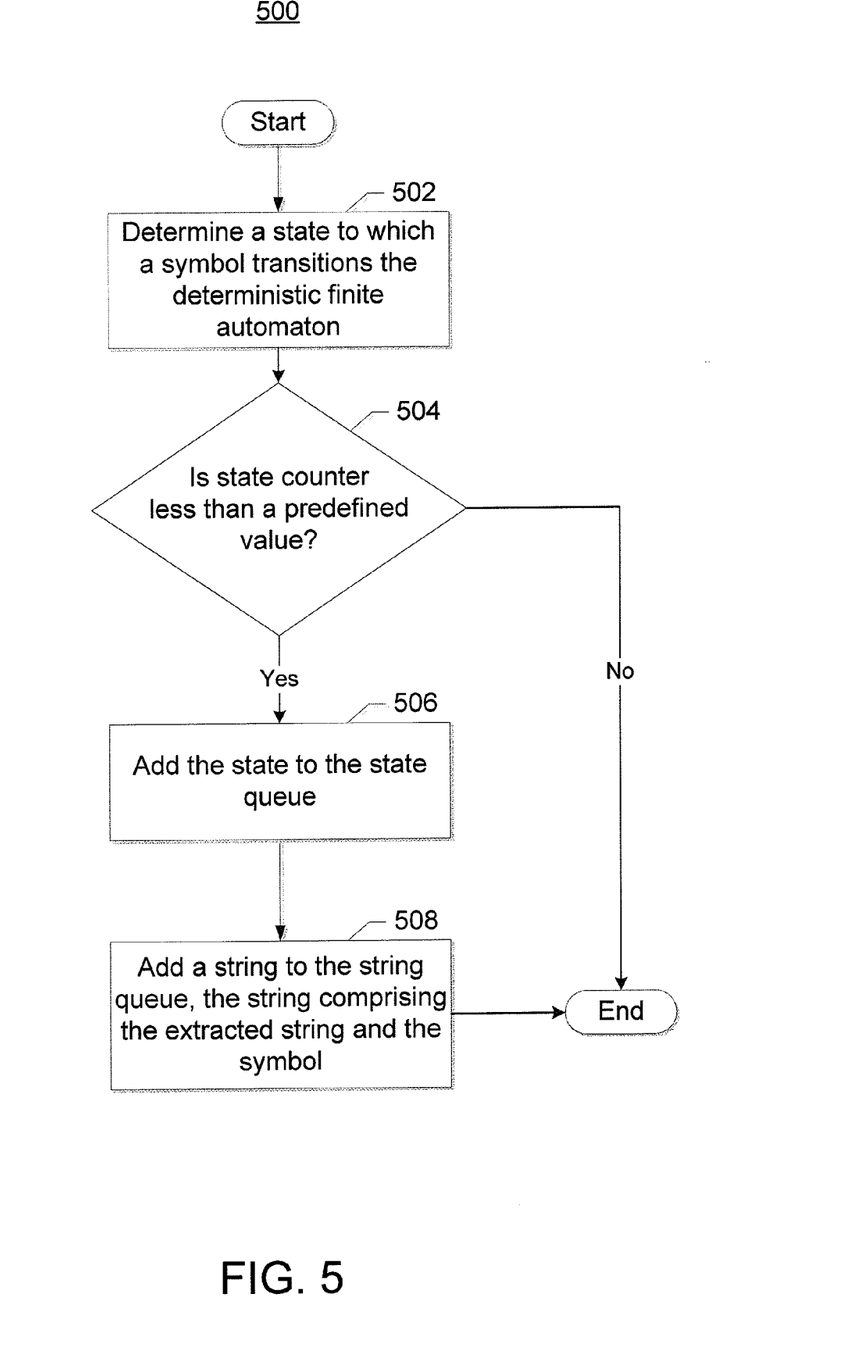
FIG. 5 illustrates a flowchart describing example operations for updating the state queue and a string queue based on a specific symbol, in accordance with some example embodiments.

Turning now to FIG. 5, a flowchart is shown that describes example operations for updating the state queue and the string queue based on an individual symbol. As noted above with respect to operation 418, the sequence of operations shown in FIG. 5 may be iterated for each symbol of the above-identified set of symbols. In operation 502, the apparatus 100 may include means, such as the processor 104 or the like, for determining a state to which the symbol transitions the DFA. For example, the DFA object may include a getNextState(state, symbol) function, that uses the transition function associated with the DFA of the given "state" argument and returns the next reachable state from the given "state" and "symbol" arguments. As previously described, each DFA includes a transition function between states. Based on the extracted state and a specific symbol, the apparatus 100 may accordingly query the object storing the DFA to determine a state to which the DFA transitions.

In operation 504, the apparatus 100 may further include means, such as processor 104, memory 108, or the like, for determining whether the counter associated with the state is less than a predefined value, such as 2. To accomplish this task, the apparatus 100 may query the data structure storing the counter. If the counter is not less than the predefined value, then the procedure ends, and the state queue and string queue need not be updated based on the symbol.

However, if the counter is less than the predefined value, in operation 506, the apparatus 100 may further include means, such as processor 104, memory 108, or the like, for adding the state determined in operation 502 to the state queue. Similarly, in operation 508, the apparatus may further include means, such as processor 104, memory 108, or the like, for adding a new string to the string queue. The new string added to the string queue comprises the extracted string and the symbol used in operation 502. In one embodiment, the new string comprises the concatenation of the extracted string and the symbol. Of course, the ordering of operations 506 and 508 may be reversed in some embodiments. Further, as previously noted, the operations described herein in conjunction with FIG. 5 may be repeated for each symbol that causes a transition from the extracted state.

As described above, certain example embodiments of the present invention may take advantage of the DFA form of a regular expression and provide a generic method for constructing the elementary string set. As a result, the elementary string set may be used to construct use cases for testing software programs that use regular expression. Accordingly, software engineers using embodiments described herein can improve the quality of tests and the test coverage reliability for software programs that use regular expressions. Moreover, these embodiments simplify the complexity associated with the process of writing tests for software that uses regular expressions.

As described above, FIGS. 2-5 illustrate flowcharts of the operation of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 108 of an apparatus employing an embodiment of the present invention and executed by a processor 104 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a regular expression;
   creating a deterministic finite automaton (DFA) based on the regular expression; and
   using the DFA, by a processor, to generate an elementary string set,
   wherein each string of the elementary string set matches the regular expression,
   wherein using the DFA to generate the elementary string set comprises:
   adding a start state of the DFA to the state queue,
   adding an empty string to a string queue, and
   processing each state in the state queue, wherein processing a state in the state queue comprises:
   extracting the state from the state queue,
   extracting a string from the string queue, incrementing a counter associated with the state,
updating a data structure to store the counter,
in an instance in which the state is terminal, adding the extracted string to the elementary string set,
retrieving a set of symbols that cause a transition from the state to another state in the DFA, and
for each symbol of the set of symbols, updating the state queue and the string queue based on the symbol,
wherein the data structure comprises a tree structure, each state being a key of the tree structure and the associated counter being a value of the tree structure associated with the key, and
wherein (a) a second state of the plurality of states is defined by transitioning a first state of the state queue to the second state using a symbol, and (b) wherein the second state comprises no more than two instances of the symbol; and
wherein (a) each string in the elementary string set will loop no more than twice while matching the regular expression, (b) the string set is maximal having no more than one string with same properties matching the regular expression, and (c) the elementary string set is generated to test software that uses the regular expression.

2. The method of claim 1, wherein updating the state queue and the string queue based on the symbol comprises:
determining a new state to which the symbol transitions the DFA;
in an instance in which the counter in the data structure and associated with the new state is less than a predefined value:
adding the new state to the state queue; and
adding a new string to the string queue, the new string comprising the extracted string and the symbol.

3. The method of claim 1, wherein the elementary string set includes every string that is represented by the regular expression and that does not include a symbol that repeats more than twice.

4. An apparatus comprising at least one processor and at least one memory including computer program code, the at least one memory and the computer program code configured to, with the at least one processor, cause the apparatus to:
receive a regular expression;
create a deterministic finite automaton (DFA) based on the regular expression; and
use the DFA to generate an elementary string set,
wherein each string of the elementary string set matches the regular expression,
wherein using the DFA to generate the elementary string set comprises:
adding a start state of the DFA to the state queue,
adding an empty string to a string queue, and
processing each state in the state queue, wherein processing a state in the state queue comprises:
extracting the state from the state queue,
extracting a string from the string queue,
incrementing a counter associated with the state,
updating a data structure to store the counter,
in an instance in which the state is terminal, adding the extracted string to the elementary string set,
retrieving a set of symbols that cause a transition from the state to another state in the DFA, and
for each symbol of the set of symbols, updating the state queue and the string queue based on the symbol,
wherein the data structure comprises a tree structure, each state being a key of the tree structure and the associated counter being a value of the tree structure associated with the key, and
wherein (a) a second state of the plurality of states is defined by transitioning a first state of the state queue to the second state using a symbol, and (b) wherein the second state comprises no more than two instances of the symbol; and
wherein (a) each string in the elementary string set will loop no more than twice while matching the regular expression, (b) the string set is maximal having no more than one string with the same properties matching the regular expression, and (c) the elementary string set is generated to test software that uses the regular expression.

5. The apparatus of claim 4, wherein the at least one memory and the computer program code are configured to, with the at least one processor, cause the apparatus to update the state queue and the string queue based on the symbol by:
determining a new state to which the symbol transitions the DFA;
in an instance in which the counter in the data structure and associated with the new state is less than a predefined value:
adding the new state to the state queue; and
adding a new string to the string queue, the new string comprising the extracted string and the symbol.

6. The apparatus of claim 4, wherein no string in the elementary string set will include a symbol that repeats more than twice.

7. A computer program product comprising at least one non-transitory computer-readable storage medium having computer-executable program code portions stored therein, the computer-executable program code portions comprising program code instructions that, when executed, cause an apparatus to:
receive a regular expression;
create a deterministic finite automaton (DFA) based on the regular expression; and
use the DFA to generate an elementary string,
wherein each string of the elementary string set matches the regular expression,
wherein using the DFA to generate the elementary string set comprises:
adding a start state of the DFA to the state queue,
adding an empty string to a string queue, and
processing each state in the state queue, wherein processing a state in the state queue comprises:
extracting the state from the state queue,
extracting a string from the string queue,
incrementing a counter associated with the state,
updating a data structure to store the counter,
in an instance in which the state is terminal, adding the extracted string to the elementary string set,
retrieving a set of symbols that cause a transition from the state to another state in the DFA, and
for each symbol of the set of symbols, updating the state queue and the string queue based on the symbol,
wherein the data structure comprises a tree structure, each state being a key of the tree structure and the associated counter being a value of the tree structure associated with the key, and
wherein (a) a second state of the plurality of states is defined by transitioning a first state of the state queue to the second state using a symbol, and (b) wherein the second state comprises no more than two instances of the symbol;

wherein (a) each string in the elementary string set will loop no more than twice while matching the regular expression, (b) the string set is maximal having no more than one string with the same properties matching the regular expression, and (c) the elementary string set is generated to test software that uses the regular expression.

8. The computer program product of claim 7, wherein the program code instructions that, when executed, cause an apparatus to update the state queue and the string queue based on the symbol comprise program code instructions that, when executed, cause the apparatus to:

determine a new state to which the symbol transitions the DFA;

in an instance in which the counter in the data structure and associated with the new state is less than a predefined value, add the new state to the state queue; and add a new string to the string queue, the new string comprising the extracted string and the symbol.

9. The computer program product of claim 7, wherein no string in the elementary string set will include a symbol that repeats more than twice.

* * * * *